(12) United States Patent
Zhang et al.

(10) Patent No.: US 10,280,110 B2
(45) Date of Patent: May 7, 2019

(54) METHOD FOR STRENGTHENING EDGE OF ARTICLE, GLASS, AND DISPLAY APPARATUS

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Lei Zhang, Beijing (CN); Taofeng Xie, Beijing (CN); Lingyan Wu, Beijing (CN); Yang Liu, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 2 days.

(21) Appl. No.: 15/653,331

(22) Filed: Jul. 18, 2017

(65) Prior Publication Data

US 2018/0044226 A1  Feb. 15, 2018

(30) Foreign Application Priority Data

Aug. 11, 2016  (CN) .......................... 2016 1 0656254

(51) Int. Cl.
| | |
|---|---|
| *C03C 15/00* | (2006.01) |
| *C03C 19/00* | (2006.01) |
| *C09K 13/06* | (2006.01) |
| *C09K 13/08* | (2006.01) |

(52) U.S. Cl.
CPC .............. *C03C 15/00* (2013.01); *C03C 19/00* (2013.01); *C09K 13/06* (2013.01); *C09K 13/08* (2013.01); *C03C 2218/118* (2013.01); *C03C 2218/31* (2013.01); *C03C 2218/328* (2013.01); *C03C 2218/355* (2013.01)

(58) Field of Classification Search
CPC ...................................................... C03C 15/00
See application file for complete search history.

(56) References Cited

U.S. PATENT DOCUMENTS

| 3,843,472 A | 10/1974 | Toussaint et al. |
| 2009/0324899 A1* | 12/2009 | Feinstein ................ C03C 15/00 |
| | | 428/195.1 |
| 2010/0246016 A1* | 9/2010 | Carlson ................... C03C 15/00 |
| | | 359/599 |

(Continued)

FOREIGN PATENT DOCUMENTS

| CN | 1426381 A | 6/2003 |
| CN | 103108842 A | 5/2013 |

(Continued)

OTHER PUBLICATIONS

First Chinese Office Action, for Chinese Patent Application No. 201610656254.8, dated Apr. 18, 2018, 17 pages.

*Primary Examiner* — Cynthia Szewczyk
(74) *Attorney, Agent, or Firm* — Kinney & Lange, P.A.

(57) ABSTRACT

This disclosure relates to a method for strengthening an edge of a glass plate, a glass, and a display apparatus, wherein the article comprises a side surface located at the edge, and the method for strengthening an edge of an article comprises the steps of: applying an etching paste at least to the side surface of the article to perform etching so as to strengthen the edge of the article; and removing the etching paste.

17 Claims, 5 Drawing Sheets

(56) References Cited

U.S. PATENT DOCUMENTS

| | | | |
|---|---|---|---|
| 2011/0242018 A1 | 10/2011 | Kang et al. | |
| 2012/0052302 A1 | 3/2012 | Matusick et al. | |
| 2013/0109116 A1* | 5/2013 | Cavuoti | C03C 15/02 438/27 |
| 2013/0288010 A1* | 10/2013 | Akarapu | B24B 9/10 428/157 |
| 2013/0299452 A1* | 11/2013 | Myers | C03C 15/00 216/24 |
| 2015/0060401 A1* | 3/2015 | Chang | C03C 15/02 216/38 |
| 2017/0101557 A1 | 4/2017 | Wang et al. | |

FOREIGN PATENT DOCUMENTS

| | | |
|---|---|---|
| CN | 103359946 A | 10/2013 |
| CN | 203238173 U2 | 10/2013 |
| CN | 103420616 A | 12/2013 |
| CN | 103586244 A | 2/2014 |
| CN | 103626401 A | 3/2014 |
| CN | 103803806 A | 5/2014 |
| CN | 203610397 U | 5/2014 |
| CN | 103880293 A | 6/2014 |
| CN | 203668237 U | 6/2014 |
| CN | 103936289 A | 7/2014 |
| CN | 104108888 A | 10/2014 |
| CN | 104699292 A | 6/2015 |
| CN | 204385060 U | 6/2015 |
| CN | 105255376 A | 1/2016 |
| CN | 205185440 U | 4/2016 |
| CN | 205202381 U | 5/2016 |
| TW | 201348099 A | 12/2012 |
| TW | 201400428 A | 1/2014 |

* cited by examiner

METHOD FOR STRENGTHENING EDGE OF ARTICLE, GLASS, AND DISPLAY APPARATUS

CROSS REFERENCE TO RELATED APPLICATION

The application claims the priority of the Chinese Application No. 201610656254.8 filed on Aug. 11, 2016, whose total contents are incorporated by reference.

FIELD OF THE INVENTION

This disclosure relates to the field of material strengthening, and specifically, a method for strengthening an edge of an article, a glass, and a display apparatus.

BACKGROUND

An article formed from a brittle material, in particular a glass article, is required to be subjected to a secondary strengthening after a primary strengthening to ensure the edge strength. A conventional secondary strengthening employs HF chemical strengthening. In HF chemical strengthening, a glass is attached with acid-resistant films on both sides thereof and then soaked in a HF solution to be subjected to edge corrosion so that defects of edges thereof become smooth and therefore the edge strength of the glass is improved. However, the conventional wet-process HF chemical strengthening process has a high investment of equipment and a large floor area, the HF solution is prone to volatilize and cause damage to human bodies, and it is difficult to treat the HF waste liquid.

SUMMARY

A first aspect of this disclosure provides a method for strengthening an edge of an article, and the article comprises a side surface located at the edge, wherein the method comprises the steps of:

applying an etching paste at least to the side surface of the article to perform etching so as to strengthen the edge of the article; and removing the etching paste.

In one embodiment, the method further comprises: before applying the etching paste, providing a protective layer on at least one surface adjacent to the side surface of the article.

In one embodiment, the method further comprises: before applying the etching paste, stacking a plurality of the articles to form an article stack and a protective layer is provided between two adjacent articles in the article stack.

In one embodiment, the article comprises a glass plate.

In one embodiment, the method further comprises: before applying the etching paste, providing protective layers on the upper surface of the glass plate and the lower surface of the glass plate and maintaining side surfaces of the glass plate to be exposed.

In one embodiment, the protective layer does not cover a first edge area of the upper surface of the glass plate, and the protective layer does not cover a second edge area of the lower surface of the glass plate.

In one embodiment, a first length of the first edge area in a direction vertical to an intersecting line between the upper surface of the glass plate and a side surface of the glass plate is in a range of 0.1 mm-0.5 mm, and a second length of the second edge area in a direction vertical to an intersecting line between the lower surface of the glass plate and a side surface of the glass plate is in a range of 0.1 mm-0.5 mm.

In one embodiment, the method further comprises stacking a plurality of the glass plates provided with the protective layers to form a glass plate stack.

In one embodiment, the method further comprises maintaining the glass plate stack by a clamp via the upper surface of the glass plate stack and the lower surface of the glass plate stack, until the etching paste is removed.

In one embodiment, providing the etching paste comprises providing the etching paste by using a coating roller.

In one embodiment, removing the etching paste comprises removing the etching paste by spraying.

In one embodiment, the spraying is performed with water having a pressure in a range of 0.3 MPa-0.6 MPa.

In one embodiment, the method further comprises removing the protective layer after removing the etching paste.

In one embodiment, based on the total weight of the etching paste, the etching paste comprises:

5 wt % to 30 wt % of a fluoride;
21 wt % to 41 wt % of a filler;
9 wt % to 29 wt % of an acid;
5 wt % to 25 wt % of a thickener;
1 wt % to 20 wt % of a surfactant;
20 wt % to 40 wt % of a polishing powder; and
10 wt % to 30 wt % of water.

In one embodiment, the fluoride is one or more selected from hydrofluoric acid, sodium fluoride and ammonium fluoride; the filler is one or more selected from starch and a surface modified $SiO_2$; the acid is one or more selected from oxalic acid and acetic acid; the thickener is one or more selected from starch, silica gel and diatomite; the surfactant is one or more selected from a sulfate, ethanol and isopropanol; the polishing powder is one or more selected from cerium oxide, aluminum oxide and chromium oxide; and the water is deionized water.

In one embodiment, the etching allows an etching depth in a direction vertical to a side surface of the glass plate to be in a range of 10 μm-50 μm.

In one embodiment, the etching time of the etching is in a range of 30-360 minutes.

In one embodiment, the protective layer comprises at least one of an acid-resistant film, a peelable adhesive, and a separator paper.

A second aspect of this disclosure provides a glass, wherein the glass is produced by using the above method for strengthening an edge of an article.

A third aspect of this disclosure provides a display apparatus, wherein the display apparatus comprises the glass as described above.

BRIEF DESCRIPTION OF THE DRAWINGS

In order to illustrate the technical solutions in embodiments of this disclosure more clearly, the accompanying drawings of embodiments will be simply illustrated below. It is to be understood that the accompanying drawings described below are merely some embodiments related to this disclosure but not limitations of this disclosure, in which:

FIG. 2 (b) is a flow chart illustrating a method for strengthening an edge of an article in still another embodiment according to this disclosure;

DETAILED DESCRIPTION

In order to enable objects, technical solutions, and advantages of embodiments of this disclosure to be clearer, the technical solutions of embodiments of this disclosure will be described clearly and fully below in conjunction with the accompanying drawings. Obviously, the embodiments described are a part of the embodiments of this disclosure, rather than all embodiments. Based on the embodiments described of this disclosure, all other embodiments obtained by the person skilled in the art without performing inventive work also belong to the scope protected by this disclosure.

When an element and its embodiment of this disclosure are introduced, the articles "a", "an", "the", and "said" are intended to indicate that there are one or more elements. The terms "comprise", "include", "contain", and "have" are intended to be inclusive and indicate that there may be additional elements other than the elements listed.

For the purpose of the description of the surface hereinafter, the terms "upper", "lower", "left", "right", "vertical", "horizontal", "top", "bottom", and derivatives thereof shall relate to the disclosure as it is oriented in the accompanying drawings. The terms "on", "on the top of", "located on", and "located on the top of" mean that there is a first element such as a first structure present on a second element such as a second structure, wherein there may be an intermediate element such as an interface structure between the first element and the second element. The term "contact" means that a first element such as a first structure and a second element such as a second structure are connected and there may be or not be other elements at the interface of the two elements.

Figure 1:
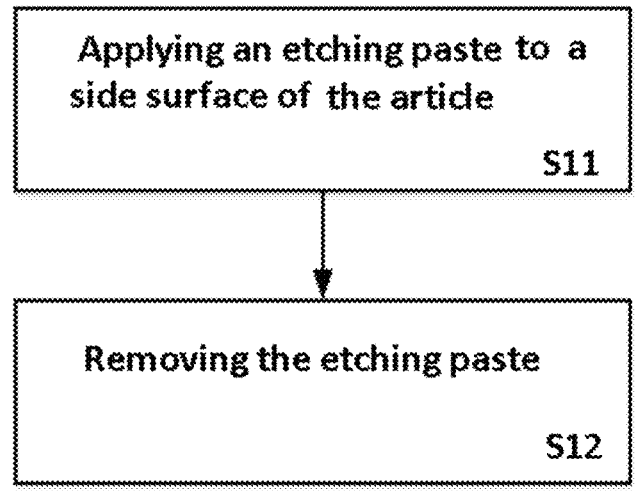
FIG. 1 is a flow chart illustrating a method for strengthening an edge of an article in an embodiment according to this disclosure.

FIG. 1 is a flow chart of a method for strengthening an edge of an article in an embodiment according to this disclosure. As shown in FIG. 1, the method for strengthening an edge of an article comprises the steps of:

S11. applying an etching paste to a side surface of the article to perform etching to strengthen an edge of the article;

S12. removing the etching paste.

By applying the etching paste to the article at least from the side surface of the article, the defects of the edge of the article can be made smooth so as to improve the edge strength of the glass. In the process of practical production, the etching paste may also be applied on the upper surface and/or the lower surface of the article as needed. Furthermore, when the etching paste is applied to the side surface of the article, circumstances that the etching paste may flow to the upper surface and/or the lower surface of the article may also be included.

The article may include any suitable brittle article. Examples of the article include but are not limited to glass, ceramic, silicon, semiconductor materials, and a combination thereof. Herein, the term "edge" refers to a peripheral portion of an article. The edge may include a straight edge portion, a curved edge portion, a beveled edge portion, a rough edge portion, a sharp edge portion, and a combination thereof. Herein, the article may have any shape.

Figure 2A:
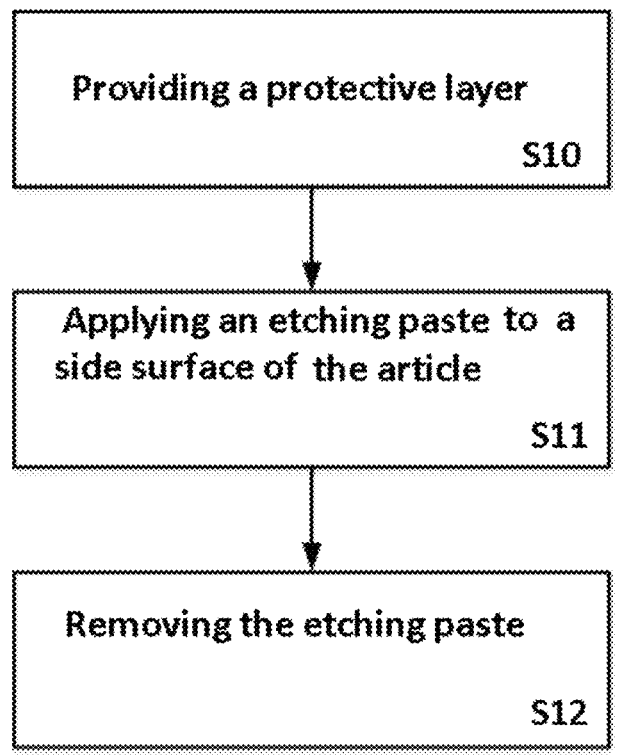
FIG. 2 (a) is a flow chart illustrating a method for strengthening an edge of an article in still another embodiment according to this disclosure.
Figure 2B:
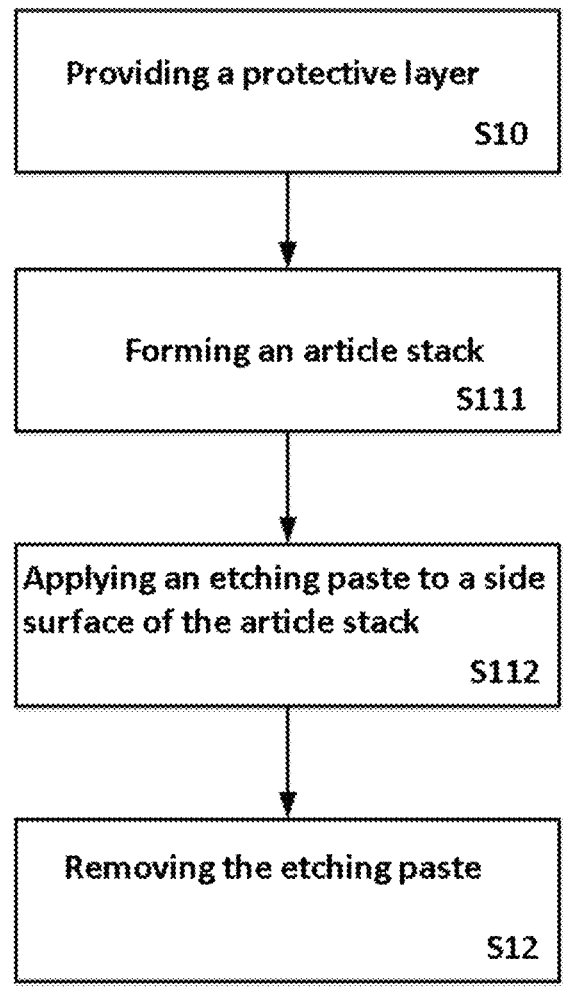

FIG. 2 (a) is a flow chart illustrating a method for strengthening an edge of an article in still another embodiment according to this disclosure. Unlike the method in FIG. 1, the method for strengthening an edge of an article in FIG. 2 (a) further comprises: before applying the etching paste, providing a protective layer on at least one surface adjacent to the side surface of the article. As shown in FIG. 2 (a), at this time, the method for strengthening an edge of an article comprises the steps of:

S10. providing a protective layer on at least one surface adjacent to the side surface of the article;

S11. applying an etching paste to a side surface of the article to perform etching to strengthen an edge of the article;

S12. removing the etching paste.

When it comes to the field of display such as touch control screens, glass is required to be subjected to edge strengthening. For example, when it comes to an OGS (one glass solution) product, since the glass is cut to cause a reduced edge strength, edge strengthening is required to be performed in order to ensure the edge strength of the glass.

FIG. 2 (b) is a flow chart illustrating a method for strengthening an edge of an article in still another embodiment according to this disclosure. In one embodiment, the method further comprises: before applying the etching paste, stacking a plurality of the articles to form an article stack so that a protective layer is provided between two adjacent articles in the article stack. Particularly, as shown in FIG. 2 (b), at this time, the method for strengthening an edge of an article comprises the steps of:

S10. providing a protective layer on at least one surface adjacent to the side surface of the article;

S111. stacking a plurality of the articles to form an article stack so that a protective layer is provided between two adjacent articles in the article stack;

S112. applying an etching paste to a side surface of the article stack to perform etching to strengthen an edge of the article;

S12. removing the etching paste.

Figure 3:
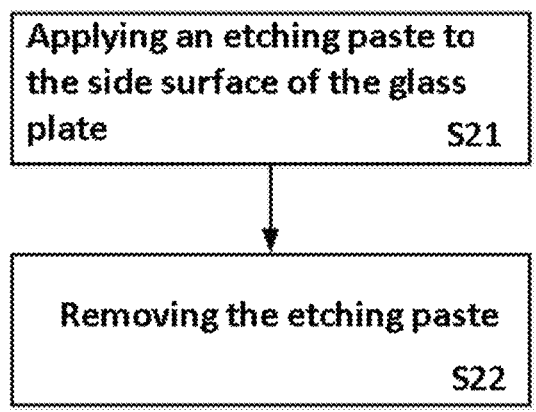
FIG. 3 is a flow chart illustrating a method for strengthening an edge of a glass plate in an embodiment according to this disclosure.

FIG. 3 is a flow chart illustrating a method for strengthening an edge of a glass plate in an embodiment according to this disclosure. As shown in FIG. 3, the method for strengthening an edge of an article comprises the steps of:

S21. applying an etching paste to the side surface of the glass plate to perform etching to strengthen an edge of the glass plate;

S22. removing the etching paste.

Figure 4:
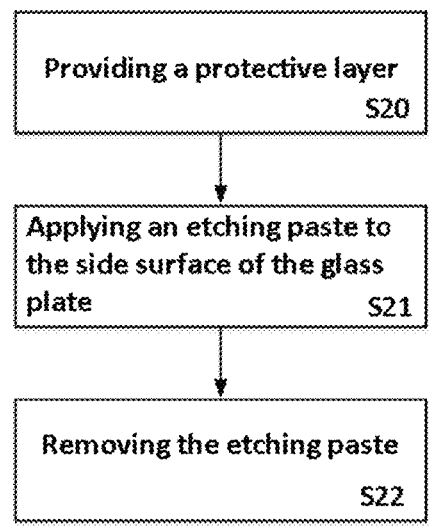
FIG. 4 is a flow chart illustrating a method for strengthening an edge of a glass plate in still another embodiment according to this disclosure.

FIG. 4 is a flow chart illustrating a method for strengthening an edge of a glass plate in still another embodiment according to this disclosure. Unlike the method in FIG. 3, the method for strengthening an edge of a glass plate in FIG. 4 further comprises: before applying the etching paste, providing protective layers on the upper surface of the glass plate and the lower surface of the glass plate and maintaining the side surfaces of the glass plate to be exposed. As shown in FIG. 4, at this time, the method for strengthening an edge of a glass comprises the steps of:

S20. providing protective layers on the upper surface of the glass plate and the lower surface of the glass plate to expose the side surfaces of the glass plate;

S21. applying an etching paste to side surfaces of the glass to perform etching to strengthen an edge of the glass plate;

S22. removing the etching paste.

Particularly, in view of the problem of the provision precision when the protective layer is provided, in order to provide the protective layer in a better manner, protective layers are provided in a part of areas on the upper surface and the lower surface of the glass plate, so that the protective layer does not cover a first edge area of the upper surface of the glass plate, and the protective layer does not cover a second edge area of the lower surface of the glass plate. Furthermore, the etching paste may also be added to respective edge areas on the upper surface and the lower surface of the glass plate as needed.

Figure 5A:
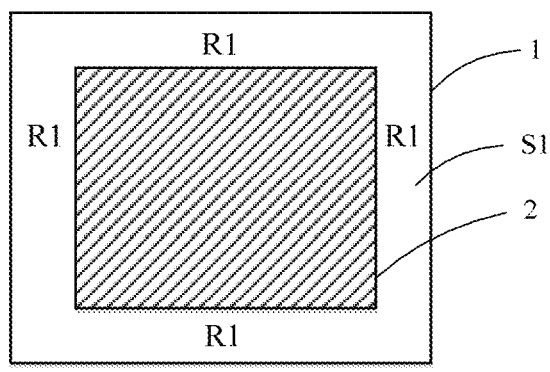
FIG. 5 (a) and FIG. 5 (b) are schematic diagrams of an embodiment according to this disclosure.
Figure 5B:
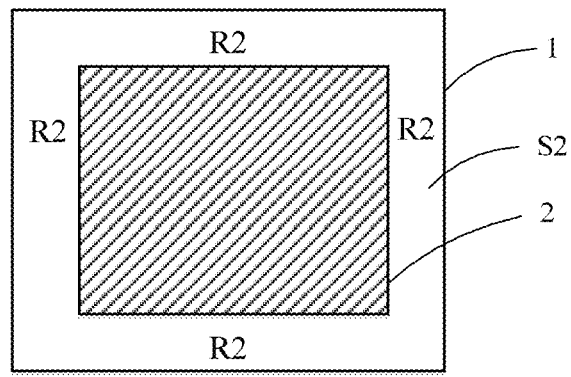

FIG. 5 is schematic diagrams of an embodiment according to this disclosure, wherein FIG. 5 (a) is a top view observed above the glass plate, and FIG. 5 (a) is a bottom view observed below the glass plate.

Particularly, as shown in FIG. 5 (a), the protective layer 2 is applied onto the upper surface S1 of the glass plate 1 and the protective layer is not provided in the first edge area R1 of the upper surface of the glass plate, so that the protective layer does not cover the first edge area R1 of the upper surface of the glass plate. As shown in FIG. 5 (b), the protective layer 2 is applied onto the lower surface S2 of the glass plate 1 and the protective layer is not provided in the second edge area R2 of the lower surface of the glass plate, so that the protective layer does not cover the second edge area R2 of the lower surface of the glass plate.

As is to be indicated, it is merely exemplary that each of the first edge area R1 and the second edge area R2 shown in FIG. 5 (a) and FIG. 5 (b) is located at four peripheral positions of each of the upper surface and the lower surface, and the positions of the first edge area R1 and the second edge area R2 are not limited to the positions shown in FIG. 5 (a) and FIG. 5 (b). The first edge area R1 and the second edge area R2 may be provided at any suitable positions as needed, and for example, each of the first edge area R1 and the second edge area R2 may be located at a peripheral position of each of the upper surface and the lower surface.

Figure 6A:
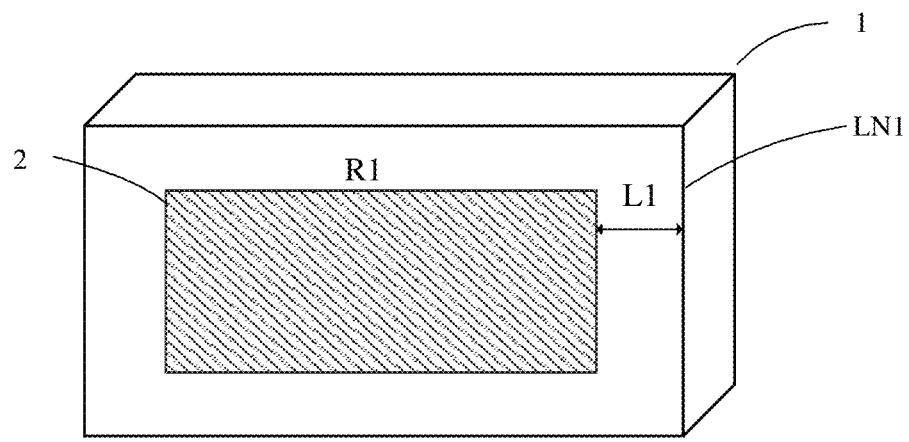
FIG. 6 (a) and FIG. 6 (b) are further schematic diagrams of an embodiment according to this disclosure.
Figure 6B:
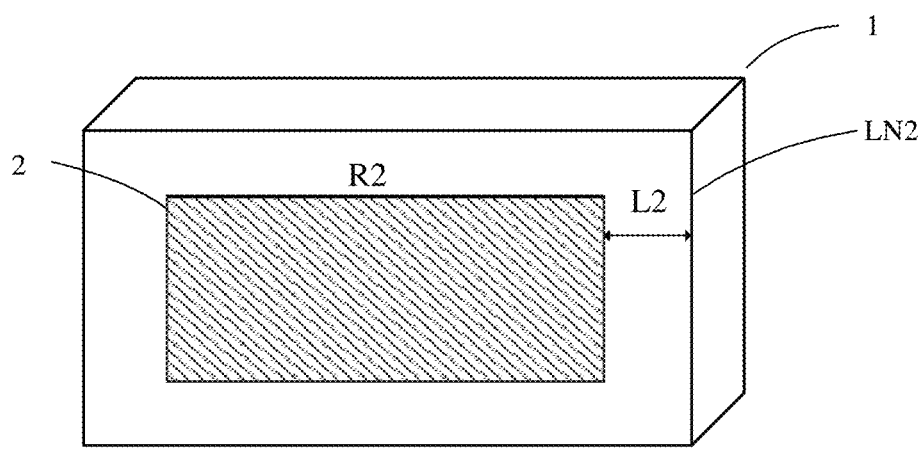

FIG. 6 is further schematic diagrams of an embodiment according to this disclosure. For the purpose of simplicity, the thickness of the protective layer is omitted in FIG. 6.

As shown in FIG. 6 (a), the protective layer 2 is provided on the upper surface of the glass plate 1, and LN1 is an intersecting line between the upper surface and a side surface of the glass plate. In view of the attachment precision of the protective layer of existing equipment, a first length L1 of the first edge area in a direction vertical to an intersecting line between the upper surface of the glass plate and a side surface of the glass plate is in a range of 0.1 mm-0.5 mm.

As is to be indicated, it is merely exemplary in FIG. 6 (a) that the distances from the protective layer 2 to the four intersecting lines between the upper surface and side surfaces of the glass plate are equal, and the distances from the protective layer 2 to the four intersecting lines between the upper surface and side surfaces of the glass plate may be not equal. In view of the attachment precision of the protective layer of existing equipment, the distance from the protective layer 2 to any of intersecting lines between the upper surface and side surfaces of the glass plate may have a range set to be 0.1 mm-0.5 mm.

As shown in FIG. 6 (b), the protective layer 2 is provided on the lower surface of the glass plate 1, and LN2 is an intersecting line between the lower surface and a side surface of the glass plate. In view of the attachment precision of the protective layer of existing equipment, a second length L2 of the second edge area in a direction vertical to an intersecting line between the lower surface of the glass plate and a side surface of the glass plate is in a range of 0.1 mm-0.5 mm.

As is to be indicated, it is merely exemplary in FIG. 6 (b) that the distances from the protective layer 2 to the four intersecting lines between the lower surface and side surfaces of the glass plate are equal, and the distances from the protective layer 2 to the four intersecting lines between the lower surface and side surfaces of the glass plate may be not equal. In view of the attachment precision of the protective layer of existing equipment, the distance from the protective layer 2 to any of the intersecting lines between the lower surface and side surfaces of the glass plate may have a range set to be 0.1 mm-0.5 mm.

In order to save the process time and reduce the cost, it is also possible to stack a plurality of glass plates to form a glass plate stack and apply an etching paste to the side surface of the glass plate stack. Furthermore, in order to better clamping the glass plate stack, the glass plate stack may be maintained by a clamp via the upper surface of the glass plate stack and the lower surface of the glass plate stack, until the etching paste is removed.

The etching paste may be applied by using a coating roller, and the rotation speed of the coating roller may be set according to practical needs.

Figure 7:
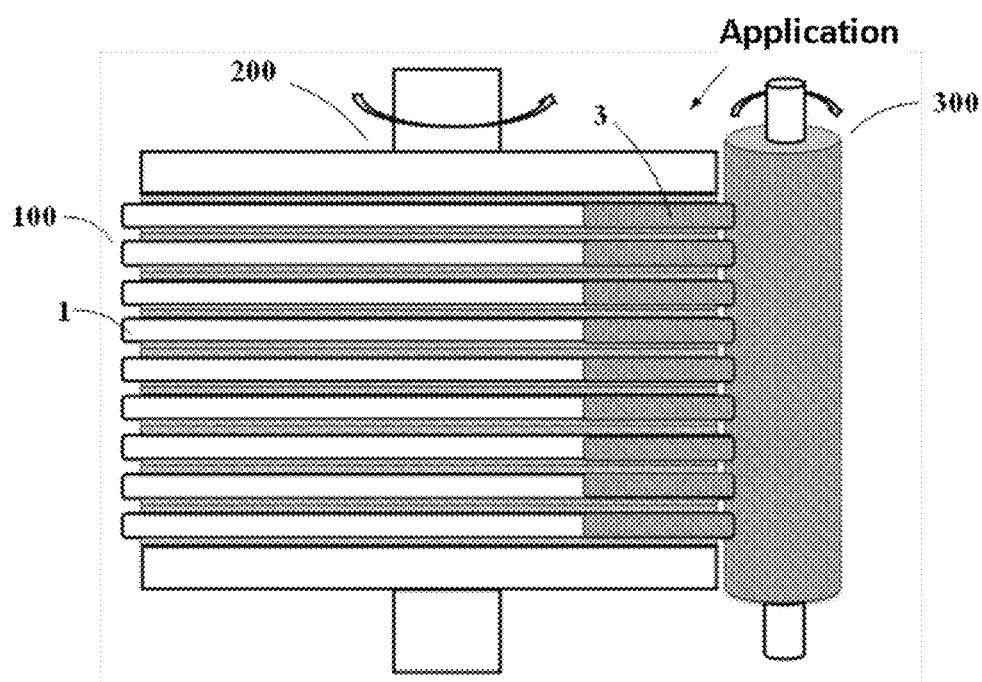
FIG. 7 is a schematic diagram of a method for strengthening an edge of a glass plate in an embodiment according to this disclosure.

FIG. 7 is a schematic diagram of a method for strengthening an edge of a glass plate in an embodiment according to this disclosure. As shown in FIG. 7, in this embodiment, the method for strengthening an edge of a glass comprises the steps of: stacking a plurality of the glass plates 1 provided with the protective layers to form a stacking structure 100; maintaining the glass plate stack via a clamp 200 by the upper surface of the glass plate stack 100 and the lower surface of the glass plate stack 100; and applying an etching paste 3 to the side surface of the glass plate stack by using a coating roller 300. In order to better applying the etching paste, the clamp 200 shown in FIG. 7 may also rotate at a certain speed.

After the etching paste 3 is applied to the article (for example, a glass) and then etched for a certain etching time, the etching paste may be removed by spraying. Particularly, the spraying may be performed with water having a pressure in a range of 0.3 MPa-0.6 MPa. After the etching paste is removed, the protective layer may be further removed. It is to be indicated that applying the etching paste is not limited to applying once, and the etching process of applying the etching paste may be repeated according to the degree of etching required.

The etching paste may include a fluorides and a starch. Particularly, the fluoride may include hydrofluoric acid and sodium fluoride, and the weight percentage of the hydrofluoric acid in the etching paste may be in a range of 5%-40%.

By comprehensively considering the effect of edge etching and the production efficiency, the etching may be set so that an etching depth in a direction vertical to a side surface of the glass plate is in a range of 10 μm-50 μm.

The concentration of the etching paste and the etching time may be adjusted according to practical needs. In one embodiment, the etching time may be in a range of 30-360 minutes. For example, if the etching depth is desired to be 30 μm, when an etching paste having a concentration (i.e., the weight percentage of hydrofluoric acid in the etching paste) of 3.5% is used, the etching speed of the etching paste having a concentration of 3.5% for glass is approximately 14 Angstroms/second, and therefore the etching time may be controlled to be about 357 minutes at this point.

Figure 8:
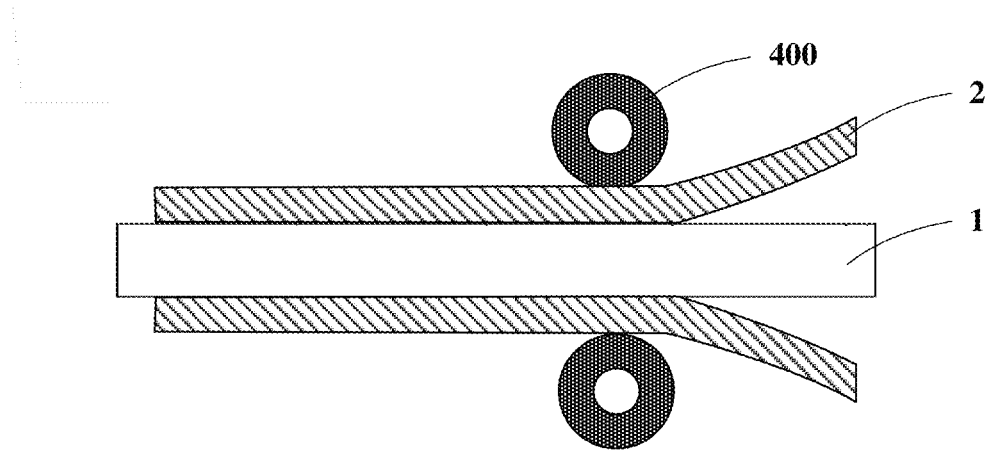
FIG. 8 is a schematic diagram of a method for strengthening an edge of a glass plate in an embodiment according to this disclosure.

The protective layer may be any layer which is not etched by the etching paste, and includes but are not limited to an acid-resistant film, a peelable adhesive, or a separator paper. FIG. 8 is a schematic diagram of a method for strengthening an edge of a glass plate in an embodiment according to this disclosure. As shown in FIG. 8, a protective layer 2, such as an acid-resistant film, may be provided on the upper surface and the lower surface of the glass plate 1 by using a roller 400.

An embodiment of this disclosure further provides a production method of a display panel, the production method of the display panel comprises the method for strengthening an edge of a glass plate as described above.

An embodiment of this disclosure further provides a display apparatus, and the display apparatus comprises a display panel, wherein the display panel is produced by the production method of a panel as described above. The display apparatus in this embodiment may be any product or member having the function of display, such as a cell phone, a tablet computer, a television, a laptop, a digital photo frame, a navigator, etc.

The etching paste according to the disclosure is a composition for strengthening an edge of an article by etching the edge of the article. Specifically, based on the total weight of the etching paste, the etching paste comprises:
  5 wt % to 30 wt % of a fluoride;
  21 wt % to 41 wt % of a filler;
  9 wt % to 29 wt % of an acid;
  5 wt % to 25 wt % of a thickener;
  1 wt % to 20 wt % of a surfactant;
  20 wt % to 40 wt % of a polishing powder; and
  10 wt % to 30 wt % of water.

Preferably, the fluoride is one or more selected from hydrofluoric acid, sodium fluoride and ammonium fluoride; the filler is one or more selected from starch and a surface modified $SiO_2$; the acid is one or more selected from oxalic acid and acetic acid; the thickener is one or more selected from starch, silica gel and diatomite; the surfactant is one or more selected from a sulfate, ethanol and iso-propanol; the polishing powder is one or more selected from cerium oxide, aluminum oxide and chromium oxide; and the water is deionized water.

According to an specific example of the disclosure, the edge of a glass plate having the sizes of 28.7 cm (length)× 20.5 cm (width)×0.7 cm (thickness) was subjected to strengthening treatment by using the method for strengthening an edge of an article as shown in FIG. 1. Based on the total weight of the etching paste, the used etching paste comprises: 5 wt % of sodium fluoride; 21 wt % of a surface modified $SiO_2$; 19 wt % of oxalic acid; 15 wt % of starch; 10 wt % of $NaSO_4$; 20 wt % of cerium oxide; and 10 wt % of deionized water. The etching paste was prepared by fully mixing the above components.

The etching time was 30 minutes and the etching depth was 10 μm. By testing the glass plate which had been subjected to the strengthening treatment by using the above method, it can be seen that the edge was well strengthened so that the technical solution of the application was achieved.

An embodiment of this disclosure provides a technical solution, which can solve problems in the prior art that edge strengthening equipment has a high investment and a large floor area, it is prone to cause damage to human bodies, and it is difficult to treat the waste liquid. By applying an etching paste to a side surface of the article to perform etching to strengthen an edge of the article, it can avoid defects in strengthening an edge of a brittle article by conventional wet etching and has the advantages of high flexibility, good utilization of materials, and small floor area.

Certain specific embodiments have been already described, and these embodiments are merely shown by way of example but are not intended to limit the scope of this disclosure. In fact, the novel embodiments described herein may be implemented in various other forms. Furthermore, various omissions, replacements, and modifications may be made to the forms of embodiments described herein, without departing from the spirit of this disclosure. The appended claims and equivalents thereof are intended to encompass such forms or modifications which fall in the scope and the spirit of this disclosure.

What is claimed is:

1. A method for strengthening an edge of an article wherein the article comprises a side surface located at the edge, comprising the steps of:
  applying an etching paste at least to the side surface of the article to perform etching so as to strengthen the edge of the article; and
  removing the etching paste,
  wherein based on the total weight of the etching paste, the etching paste comprises:
  5 wt % to 30 wt % of a fluoride;
  21 wt % to 41 wt % of a filler;
  9 wt % to 29 wt % of an acid;
  5 wt % to 25 wt % of a thickener;
  1 wt % to 20 wt % of a surfactant;
  20 wt % to 40 wt % of a polishing powder; and
  10 wt % to 30 wt % of water.

2. The method according to claim 1, wherein the method further comprises: before applying the etching paste, providing a protective layer on at least one surface adjacent to the side surface of the article.

3. The method according to claim 2, wherein the method further comprises: before applying the etching paste, stacking a plurality of the articles to form an article stack and providing the protective layer between two adjacent articles in the article stack.

4. The method according to claim 2, wherein the protective layer comprises at least one of an acid-resistant film, a peelable adhesive, and a separator paper.

5. The method for according to claim 1, wherein the article comprises a glass plate.

6. The method according to claim 5, wherein the method further comprises: before applying the etching paste, providing a first protective layer on the upper surface of the glass plate and a second protective layer on the lower surface of the glass plate and maintaining side surfaces of the glass plate to be exposed.

7. The method according to claim 6, wherein the first protective layer does not cover a first edge area of the upper surface of the glass plate, and the second protective layer does not cover a second edge area of the lower surface of the glass plate.

8. The method according to claim 7, wherein a first length of the first edge area in a direction vertical to an intersecting line between the upper surface of the glass plate and a side surface of the glass plate is in a range of 0.1 mm-0.5 mm, and a second length of the second edge area in a direction vertical to an intersecting line between the lower surface of the glass plate and a side surface of the glass plate is in a range of 0.1 mm-0.5 mm.

9. The method according to claim 8, wherein the method further comprises stacking a plurality of the glass plates provided with the protective layers to form a glass plate stack.

10. The method according to claim 9, wherein the method further comprises: maintaining the glass plate stack by a clamp via an upper surface of the glass plate stack and a lower surface of the glass plate stack, until the etching paste is removed.

11. The method according to claim 5, wherein applying the etching paste comprise applying the etching paste by using a coating roller.

12. The method according to claim 5, wherein removing the etching paste comprises removing the etching paste by spraying.

13. The method according to claim 12, wherein removing the etching paste comprises spraying water having a pressure in a range of 0.3 MPa-0.6 MPa.

14. The method according to claim 5, wherein the method further comprises removing the protective layer after removing the etching paste.

15. The method according to claim 1, wherein the fluoride is one or more selected from the group consisting of: hydrofluoric acid, sodium fluoride and ammonium fluoride; the filler is one or more selected from the group consisting of: starch and a surface modified $SiO_2$; the acid is one or more selected from the group consisting of: oxalic acid and acetic acid; the thickener is one or more selected from the group consisting of: starch, silica gel and diatomite; the surfactant is one or more selected from the group consisting of: a sulfate, ethanol and iso-propanol; the polishing powder is one or more selected from the group consisting of: cerium oxide, aluminum oxide and chromium oxide; and the water is deionized water.

16. The method according to claim 15, wherein an etching depth in a direction vertical to a side surface of the glass plate to be in a range of 10 μm-50 μm.

17. The method according to claim 16, wherein an etching time is in a range of 30-360 minutes.

* * * * *